April 12, 1927.  G. L. BUFFINGTON ET AL  1,624,529
ROTARY MOTOR
Filed March 25, 1925
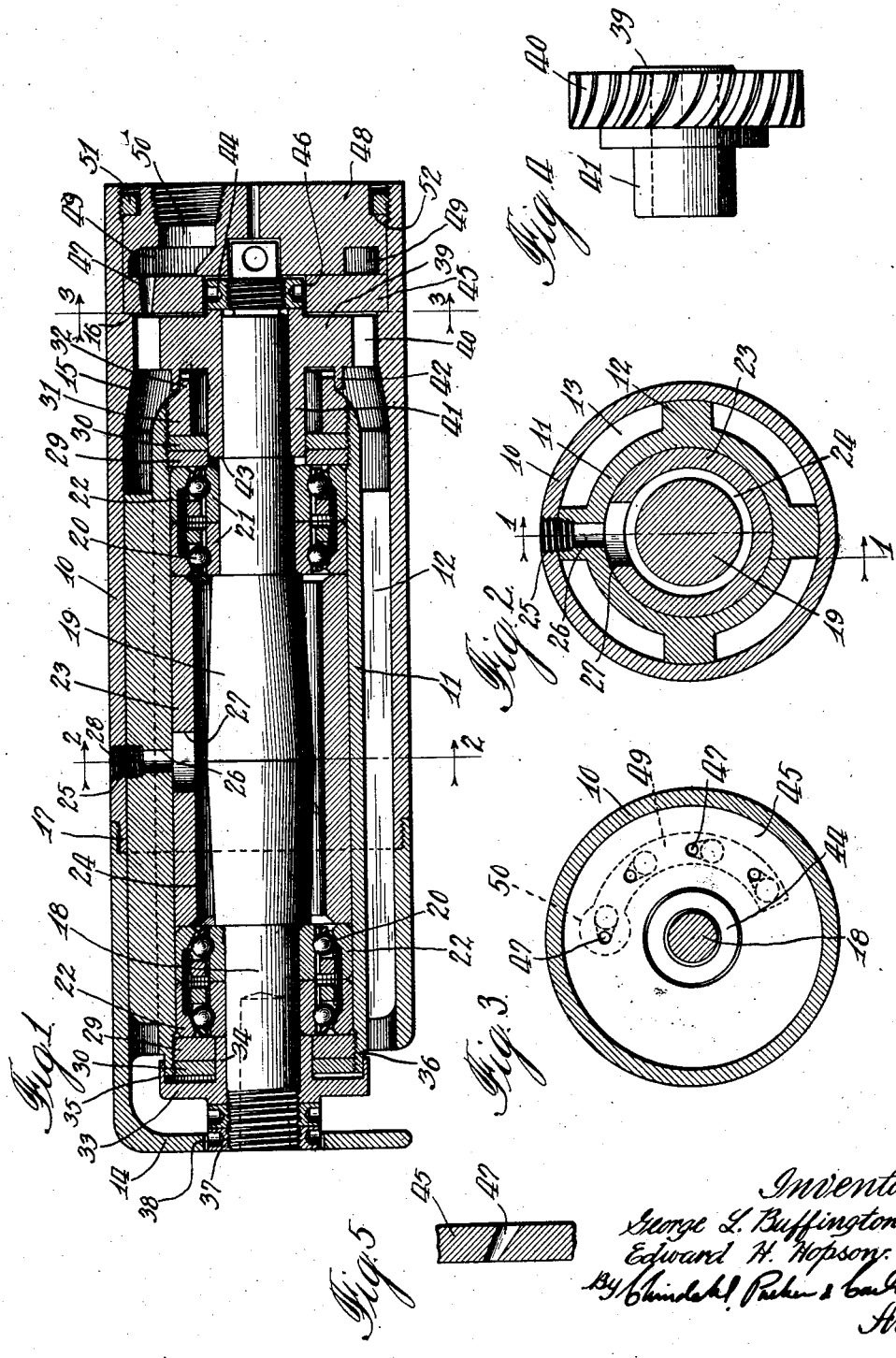

Patented Apr. 12, 1927.

1,624,529

UNITED STATES PATENT OFFICE.

GEORGE L. BUFFINGTON AND EDWARD H. HOPSON, OF DETROIT, MICHIGAN, ASSIGNORS TO EX-CELL-O TOOL & MANUFACTURING CO., OF DETROIT, MICHIGAN, A CORPORATION OF MICHIGAN.

ROTARY MOTOR.

Application filed March 25, 1925. Serial No. 18,180.

The invention relates to improvements in rotary motors having high speed spindles, and particularly in those having spindles operable by a pressure fluid medium.

An important object of the invention resides in the provision of a new and improved rotary motor in which the spindle is operable at a high speed by means of a pressure or motive fluid, and in which the fluid is exhausted through the spindle casing in a manner to cool the lubricant and the spindle bearings, thereby preventing overheating of the lubricant and excessive expansion with attendant wear of the metal parts.

A further object is to provide a rotary motor of novel construction in which the spindle bearings are completely enclosed, and in which motive fluid such as air is directed about the bearings and forcefully from the spindle casing at all points where dust, water and other foreign substances might find entrance to said bearings, thereby reducing wear and heating, and incidentally obviating the necessity of using felt or other fibrous washers for the above purpose.

Still another object is to provide a rotary motor in which the spindle is adapted to be driven by a motive fluid and which has novel means for controlling and regulating the speed of rotation.

Another object is to provide a new and improved rotary motor of simple construction, which is durable and inexpensive, which is not subject to objectionable vibration, and which can readily be assembled and disassembled.

Ancillary objects and advantages will become apparent as the description proceeds.

In the accompanying drawings, Figure 1 is a longitudinal sectional view taken along line 1—1 of Fig. 2 of a rotary motor embodying the features of our invention.

Fig. 2 is a transverse sectional view taken along line 2—2 of Fig. 1.

Fig. 3 is a transverse sectional view taken along line 3—3 of Fig. 1.

Fig. 4 is a side view of the propeller for driving the spindle.

Fig. 5 is a fragmentary sectional view showing one of the jet passages for directing pressure fluid against the propeller.

While the invention is susceptible to various modifications and alternative constructions we have shown in the drawings and will herein describe in detail the preferred embodiment thereof, but it is to be understood that we do not thereby intend to limit the invention to the specific form disclosed, but aim in the appended claims to cover all modifications and alternative constructions falling within the spirit and scope of the invention.

Referring to the exemplary embodiment of the invention illustrated in the drawings, the rotary motor comprises an outer casing 10 which preferably is cylindrical in form, and an inner casing 11 fitting snugly within the outer casing. Formed on the outer surface of the casing 11 are a plurality of radial ribs 12 which extend longitudinal thereof and which are substantially co-extensive in length therewith. The ribs are equally spaced about the periphery of the casing 11, and fit against the inner surface of the casing 10, thereby dividing the annular space between said casings into a plurality of passages 13. Formed on the front end of the casing 10 is a shield 14 of any suitable shape which extends across the forward ends of the passages 13 and which is open at one side of said casing. The interior of the casing 10 just beyond the rear end of the casing 11 is partly reduced in size to provide a chamber 15 and to form an annular shoulder 16 facing outwardly. To facilitate assembling and disassembling the motor, the outer casing is provided in two sections having lapping end flanges 17 threaded together.

Extending freely through the inner casing 11 is a spindle 18 which is formed with an enlarged central portion 19, and which is rotatably supported at opposite sides of said enlarged portion by double ball bearings. Each set of ball bearings comprises a plurality of balls 20 interposed between two inner ball races 21 and two outer ball races 22, the faces of the latter being oppositely inclined to take care of the end thrust in both directions. A spaced sleeve 23 fitting tightly within the casing 11 is positioned between the two sets of ball bearings, and defines a central oil chamber 24 about the enlarged portion 19 of the spindle. The oil chamber opens through alined ports 25, 26 and 27 in the casing 10, casing 11 and sleeve 23, respectively, the opening being normally closed by a threaded plug 28. The ball bearings are clamped against the opposite ends of the enlarged portion 19 and of the sleeve 23 by means of a pair of ring nuts 29 and a pair of lock nuts 30 therefor, both of which are threaded into opposite ends of the inner casing 11.

A cylindrical collar 31 having an annular flange 32 on its outer end is threaded into the rear end of the casing 11 against the adjacent nut 30. Mounted on the front end of the spindle 18 for rotation therewith and within the shield 14 is a cap or guard 33 having a hub 34 extending through the adjacent clamp and lock nuts 29 and 30, and having an annular flange 35 telescoping closely with a flange 36 on the front end of the casing 11, said guard serving to effectively enclose the front bearings of the spindle to prevent the entrance of grit and other foreign matter. The hub 34 is tightly clamped against the foremost inner race 21 of the front ball bearing by a pair of nuts 37. The extreme front end of the spindle 18 with the nuts 37 projects into a circular opening 38 in the shield 14, and is adapted to have the part to be driven secured thereto.

Mounted on the rear end of the spindle 18 and in the chamber 15 is a rotor or propeller 39 having a plurality of peripheral vanes or buckets 40. The propeller is also formed with a central hub 41 extending through the collar 31 into the adjacent clamp and lock nuts 29 and 30, and with an annular flange 42 telescoping over the flange 32, to close the rear end of the casing and prevent the entrance of foreign matter to the bearings. The hub is clamped against a shoulder 43 on the spindle 18 by a nut 44.

Positioned against the shoulder 16 in the rear end of the outer casing 10 is a circular disk 45 having a central opening 46 fitting loosely over the nut 44, and having a plurality of inclined inwardly tapering jet passages 47 (four in the present instance) adapted to direct pressure fluid against the vanes 40 to rotate the propeller 39. Fitting closely against the outer surface of the disk 45 is a circular head 48 which is formed in its inner surface with an arcuate passage 49 communicating at successive points along its length with the jet passages 47, and with an inlet passage 50 opening into said arcuate passage. The head 48 is rotatably adjustable to adjust the number of jet passages 47 opening into the arcuate passage 49, and is normally clamped in adjusted position by a ring nut 51 threaded into the rear end of the casing 10 and engaging an annular notch 52 on the head.

In operation, after the head 48 has been adjusted for the desired spindle speed, pressure fluid from any suitable source is admitted through the inlet passage 50 and arcuate passage 49 to the jet passages 47 from which it is directed in streams impingeing forceably against the vanes 40 to rotate the propeller. The speed of the spindle 18 can be adjusted by cutting off or uncovering one or more of the jet passages 47. In leaving the jet passages 47 the pressure fluid is expanded, and is thereby cooled very considerably. The cooled pressure fluid exhausted from the propeller 39 passes from the chamber 15 through the passages 13 along the inner casing 10, and in so doing cools the spindle bearings, thereby dissipating the heat resulting from friction and wear. From the passages 13 the exhaust pressure fluid is forceably discharged against the shield 14, and deflected out of the side of the casing 10 where left open by the shield. The pressure fluid is thus discharged from the casing 10 at a point where grit, dust, water and other foreign matter would otherwise tend to enter, and thereby keeps the spindle bearings clean.

It will be evident that we have provided a highly advantageous rotary motor operated by fluid pressure, in which wear due to friction, overheating and grit is minimized. The construction is simple and inexpensve. By supplying pressure fluid under a known pressure to the inlet passages 50, the speed of the spindle can be determined, and by adjusting the head 48 the speed can be changed. Extremely high spindle speeds can be obtained.

We claim as our invention:

1. A rotary motor having, in combination, an outer casing having a shield at its front end, said shield being open at one side, an inner casing within said outer casing and serving therewith to define a plurality of longitudinal passages between the two, a spindle rotatably mounted in ball bearings at opposite ends of said inner casing, a spacer sleeve positioned in said inner casing and between said ball bearings, a propeller having a plurality of peripheral vanes mounted on said shaft adjacent the rear ends of said passages, a member having a jet passage opening next to said propeller and adapted to direct pressure fluid against said vanes to rotate said spindle, and means for admitting pressure fluid to said jet passage, said pressure fluid being adapted to pass from the vane through said first mentioned passages into said shield and out of said outer casing at the open side of said shield.

2. A rotary motor having, in combination, an outer casing, a shield on the front end of said outer casing, an inner casing, said outer and inner casings defining a plurality of longitudinal and peripherally spaced passages opening next to said shield, a spindle rotatably mounted in said inner casing, a propeller mounted on said spindle adjacent the rear ends of said passages, and means for directing a jet of pressure fluid against said propeller to rotate the same, the exhaust fluid from said propeller being adapted to pass from the propeller through said passages into said shield, which is adapted to discharge said fluid from the front end of said outer casing.

3. A rotary motor having, in combination, a casing, a shield on the front end of said casing and extending transversely thereof, a spindle rotatably mounted in said casing and projecting through said shield, a propeller mounted on said spindle, means for directing pressure fluid against said propeller to rotate the latter, and means for directing pressure fluid from said propeller to said shield, said shield serving to direct said pressure fluid out of said casing at one side thereof and next to the front end of said spindle.

4. A rotary motor having, in combination, an outer casing, a shield extending across the front end of said outer casing, an inner casing, said casings having means defining a plurality of passages substantially coextensive in length therewith and spaced about the periphery of said inner casing, a shaft extending through said inner casing and through said shield, ball bearings in said inner casing supporting opposite ends of said shaft, a propeller having a plurality of peripheral vanes mounted on the rear end of said shaft adjacent the rear ends of said passages, means for expanding and directing a stream of pressure fluid against said vanes to rotate said propeller, said propeller serving to exhaust said expanded pressure fluid into said passages whence it passes along the inner casing into the space in said shield.

5. A rotary motor having, in combination, an outer casing, an inner casing, a spindle rotatably mounted in said inner casing, a propeller mounted on the rear end of said spindle just beyond said inner casing, a disk having a plurality of inclined and inwardly tapering jet passages spaced at equal distances from its center, a rotatably adjustable head mounted in said casing next to said disk and having an arcuate passage adapted to communicate with said jet passages, said head upon being rotated serving to selectively uncover or cut off successive jet passages, and means for clamping said head in adjusted position.

6. A rotary motor having, in combination, a casing, a spindle rotatably mounted in said casing, a propeller having a plurality of peripherally spaced vanes mounted on said spindle, a member in said casing having a plurality of inclined jet passages opening next to said vanes and adapted to direct pressure fluid against the same, an adjustable head mounted in said casing next to said member, said head having an elongated passage and an inlet passage communicating therewith, said elongated passage being adapted to communicate with said jet passages at successive points along its length, and said head being adapted to cut off or uncover one or more of said jet passages upon being adjusted.

7. A rotary motor having, in combination, an outer casing, an inner casing peripherally spaced from said outer casing, a spindle extending through said inner casing, bearings in said inner casing supporting the opposite ends of said spindle, a propeller mounted on the rear end of said spindle just beyond said inner casing, said propeller having a plurality of peripheral vanes, a disk in said casing and having a plurality of jet passages opening next to said vanes and adapted to direct one or more jets of pressure fluid against the same, and a rotary head mounted in the rear end of said casing, and having an inlet passage adapted to admit pressure fluid to said jet passages, said inlet passage being so shaped that upon rotary adjustment of said head one or more of said jet passages are cut off or uncovered, the exhaust fluid from said propeller being adapted to pass through the space between said casing to the front end of said spindle.

In testimony whereof we have hereunto affixed our signatures.

GEORGE L. BUFFINGTON.
EDWARD H. HOPSON.